US012228419B2

(12) United States Patent
Duenas Arana et al.

(10) Patent No.: US 12,228,419 B2
(45) Date of Patent: Feb. 18, 2025

(54) SYSTEMATIC FAULT DETECTION IN VEHICLE CONTROL SYSTEMS

(71) Applicant: Zoox, Inc., Foster City, CA (US)

(72) Inventors: Guillermo Duenas Arana, San Francisco, CA (US); Soroush Dean Khadem, Boulder, CO (US); Till Kroeger, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 170 days.

(21) Appl. No.: 17/388,974

(22) Filed: Jul. 29, 2021

(65) Prior Publication Data
US 2023/0035780 A1 Feb. 2, 2023

(51) Int. Cl.
*G01C 21/00* (2006.01)
*G01C 21/36* (2006.01)
*G05D 1/00* (2006.01)

(52) U.S. Cl.
CPC ........ *G01C 21/3811* (2020.08); *G01C 21/367* (2013.01); *G01C 21/3833* (2020.08);
(Continued)

(58) Field of Classification Search
CPC .............. G01C 21/3811; G01C 21/367; G01C 21/3833; G01C 21/387; G01C 21/3819; G01C 21/3815; G01C 21/3841; G01C 21/3867; G01C 21/30; G01C 21/1652; G01C 21/3896; G01C 21/3804;
(Continued)

(56) References Cited

U.S. PATENT DOCUMENTS 6,684,182 B1 * 1/2004 Gold ........................ G06F 30/20
  701/4
9,507,346 B1 * 11/2016 Levinson ............. G05D 1/0291
(Continued)

FOREIGN PATENT DOCUMENTS

CN  106547588 A  3/2017
JP  H0883044 A   3/1996
(Continued)

OTHER PUBLICATIONS

The PCT Search Report and Written Opinion mailed Nov. 4, 2022 for PCT application No. PCT/US2022/038384, 11 pages.

*Primary Examiner* — Steven B Theriault
(74) *Attorney, Agent, or Firm* — Lee & Hayes, P.C.

(57) ABSTRACT

An evaluation computing system may implement techniques to validate a vehicle controller, such as based on a detection of a systematic fault. The evaluation computing system may access data (e.g., log data and/or map data) associated with an operation of the vehicle in an environment as controlled by the controller. The evaluation computing system may modify a portion of the map data representative of a simulated change associated with a portion of the environment. The evaluation computing system may run a simulation with a simulated environment, generated based on the modified map data, to determine whether the controller detects and/or mitigates the simulated change in a sufficient manner. Based on a determination of whether or not the controller detects and/or mitigates the simulated change in a sufficient manner, the evaluation computing system may determine an error associated with the controller or may validate the controller.

20 Claims, 5 Drawing Sheets

(52) U.S. Cl.
CPC ......... *G01C 21/387* (2020.08); *G05D 1/0221* (2013.01); *G05D 1/0276* (2013.01)

(58) Field of Classification Search
CPC ............. G01C 21/3859; G05D 1/0221; G05D 1/0276; G05D 2201/0213; G05D 1/0257; G05D 1/0274; G05D 1/0027; G05D 1/0044; G05D 1/0088; G05D 1/0272; G05D 1/0223; G06N 20/00; G06N 3/08; G06N 3/063; H04L 67/12
See application file for complete search history.

(56) References Cited

U.S. PATENT DOCUMENTS

| | | | | |
|---|---|---|---|---|
| 9,612,123 | B1 * | 4/2017 | Levinson | B60Q 1/508 |
| 9,734,455 | B2 * | 8/2017 | Levinson | G01S 7/4802 |
| 9,836,895 | B1 | 12/2017 | Nygaard et al. | |
| 10,890,663 | B2 * | 1/2021 | Shroff | G01S 17/06 |
| 10,942,030 | B2 * | 3/2021 | Haque | G06V 20/56 |
| 10,984,290 | B1 * | 4/2021 | Goel | G06T 7/579 |
| 11,301,767 | B2 * | 4/2022 | Levinson | G05D 1/0248 |
| 11,893,750 | B2 * | 2/2024 | Goel | G06F 18/217 |
| 2016/0129592 | A1 * | 5/2016 | Saboo | G05D 1/0297 |
| | | | | 700/248 |
| 2016/0236683 | A1 * | 8/2016 | Eggert | G08G 1/166 |
| 2017/0123428 | A1 * | 5/2017 | Levinson | G05D 1/0257 |
| 2017/0124476 | A1 * | 5/2017 | Levinson | G01S 17/931 |
| 2017/0124781 | A1 * | 5/2017 | Douillard | G08G 1/207 |
| 2017/0132334 | A1 * | 5/2017 | Levinson | B60W 50/00 |
| 2017/0316333 | A1 * | 11/2017 | Levinson | G01S 17/87 |
| 2018/0136651 | A1 * | 5/2018 | Levinson | B60W 30/00 |
| 2019/0171912 | A1 * | 6/2019 | Vallespi-Gonzalez | |
| | | | | G06N 7/01 |
| 2019/0220011 | A1 * | 7/2019 | Della Penna | G05D 1/0212 |
| 2019/0303759 | A1 * | 10/2019 | Farabet | G05D 1/00 |
| 2019/0322286 | A1 * | 10/2019 | Stefan | B60W 60/001 |
| 2019/0387060 | A1 * | 12/2019 | Kentley-Klay | G05D 1/024 |
| 2020/0103236 | A1 * | 4/2020 | Adams | G05D 1/0231 |
| 2020/0301799 | A1 * | 9/2020 | Manivasagam | G01S 17/006 |
| 2020/0353943 | A1 * | 11/2020 | Siddiqui | G06N 3/045 |
| 2021/0063200 | A1 * | 3/2021 | Kroepfl | C03C 17/3644 |
| 2021/0063578 | A1 * | 3/2021 | Wekel | G01S 7/481 |
| 2021/0086795 | A1 * | 3/2021 | Zhao | G08G 1/0133 |
| 2021/0094540 | A1 * | 4/2021 | Bagschik | G06V 20/58 |
| 2021/0096571 | A1 * | 4/2021 | Modalavalasa | G07C 5/0816 |
| 2021/0097148 | A1 * | 4/2021 | Bagschik | G06F 30/15 |
| 2021/0166052 | A1 * | 6/2021 | Park | G06N 3/045 |
| 2021/0180959 | A1 * | 6/2021 | Muto | G08G 1/0112 |
| 2021/0286923 | A1 * | 9/2021 | Kristensen | G01S 7/412 |
| 2021/0331703 | A1 * | 10/2021 | Duan | B60W 60/0027 |
| 2021/0380125 | A1 * | 12/2021 | Hernandez Esteban | |
| | | | | G06T 17/20 |
| 2021/0387643 | A1 * | 12/2021 | Hari | B60W 30/095 |
| 2021/0389769 | A1 * | 12/2021 | Hari | G05B 13/027 |
| 2022/0001892 | A1 * | 1/2022 | Fairley | G06V 20/582 |
| 2022/0075382 | A1 * | 3/2022 | Montemerlo | G01C 21/3446 |
| 2022/0161811 | A1 * | 5/2022 | Lu | B60W 60/0059 |
| 2022/0204019 | A1 * | 6/2022 | Lauterbach | G06T 15/205 |
| 2022/0326023 | A1 * | 10/2022 | Xu | G01C 21/3807 |
| 2023/0003531 | A1 * | 1/2023 | Strauss | G01C 21/3819 |

FOREIGN PATENT DOCUMENTS

| | | | | |
|---|---|---|---|---|
| JP | | 2019113956 A | 7/2019 | |
| WO | WO-2020045317 A1 * | | 3/2020 | ............ G01C 21/28 |

* cited by examiner

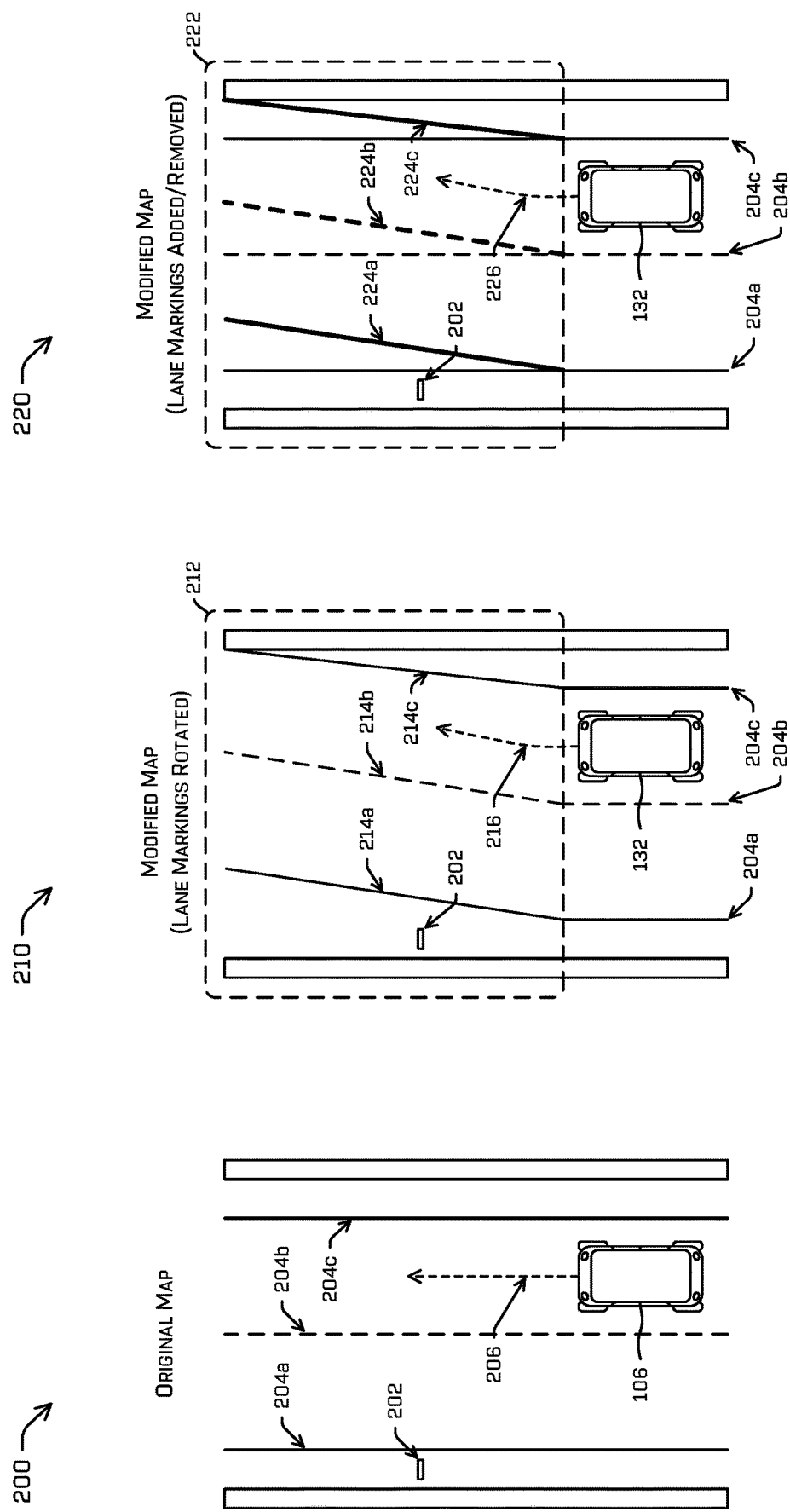

SYSTEMATIC FAULT DETECTION IN VEHICLE CONTROL SYSTEMS

BACKGROUND

Vehicles are increasingly supplementing or replacing manual functionality with automatic controls. Autonomous and/or semi-autonomous driving, however, can require use of computing systems capable of making split-second decisions to respond to myriad events and scenarios. The computing systems, such as the software and/or hardware associated therewith, may be updated, such as to optimize performance of vehicle and/or computing system operations. Prior to incorporating an update into a vehicle, the efficacy of the updated system may be confirmed via simulations, such as to evaluate a performance of the updated system as compared to a previous version. These simulations may test whether the updated system performs differently than the previous version. However, merely determining a difference in performance does not necessarily indicate whether the updated system is configured to detect and mitigate faults that may arise in the operation of the autonomous or semi-autonomous system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A illustrates an example scenario of a vehicle traversing a physical environment.

FIG. 2B illustrates an example scenario of a simulated vehicle traversing a simulated environment based on modified map data.

FIG. 2C illustrates an example scenario of a simulated vehicle traversing a simulated environment based on modified map data.

DETAILED DESCRIPTION

Figure 1:
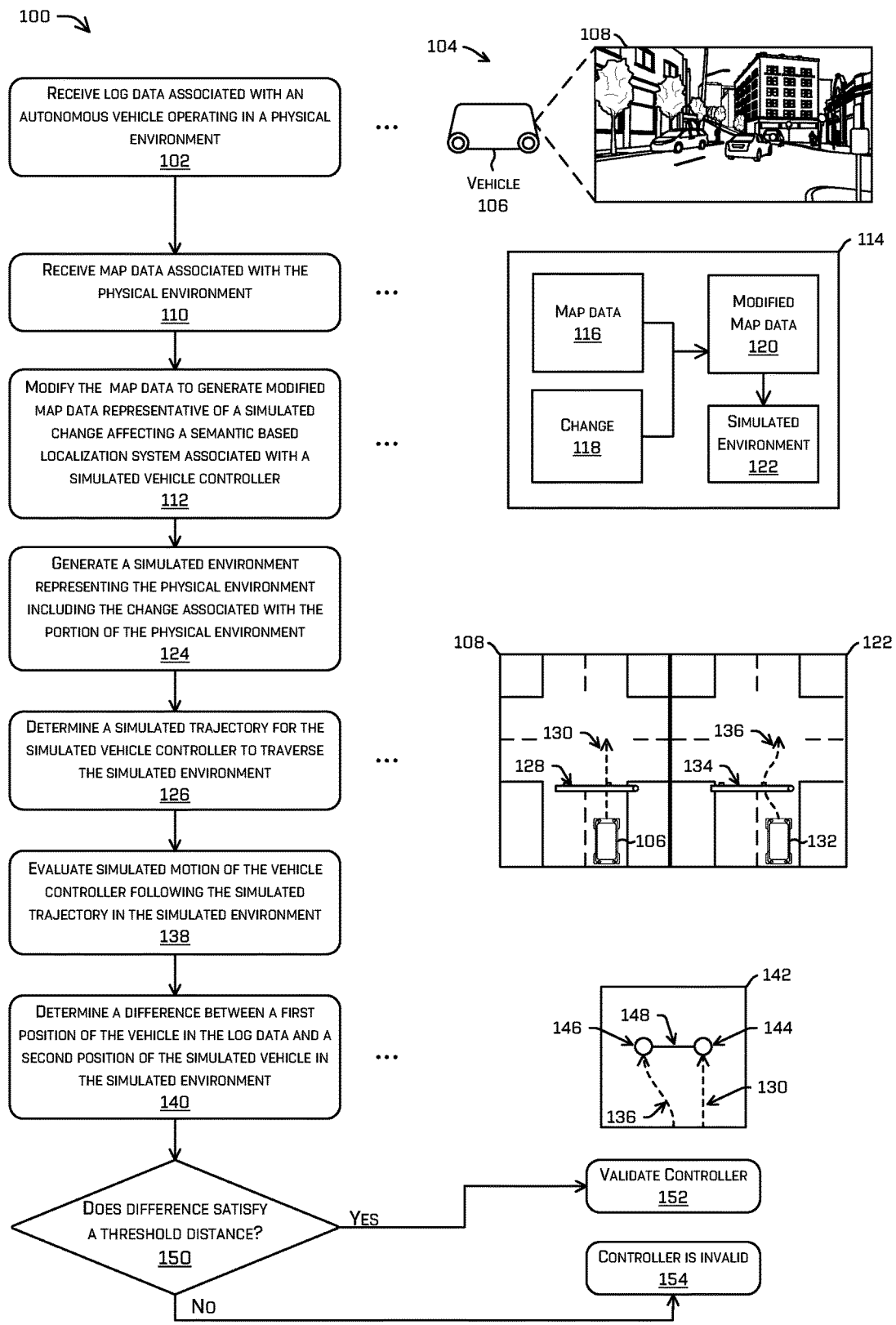
FIG. 1 illustrates a pictorial flow diagram of an example process for evaluating a performance of a vehicle controller in detecting a simulated change to aspects of a map of a physical environment, in accordance with examples of the disclosure.

Techniques for evaluating a performance of a vehicle, vehicle component, or vehicle subcomponent are discussed herein. For example, this application relates to techniques for introducing a simulated change to a portion of map data corresponding to a physical environment, generating a simulated environment based on modified map data including the simulated change, and running a simulation according to the original map data in the simulated environment to evaluate a performance of the vehicle controller in detecting and mitigating the change.

The vehicle controller may include an autonomous controller configured to control one or more functionalities of an autonomous and/or semi-autonomous vehicle (e.g., a vehicle). An evaluation computing system may receive log data associated with a previous operation of the vehicle controller controlling a vehicle in an environment. Such log data may include, for example, one or more of sensor data, output from one or more components, command, and/or other messages sent between components of the vehicle as recorded over a period of time. Additionally, or alternatively, the evaluation computing system may receive map data associated with the environment. The evaluation computing system may modify a portion of the map data to represent simulated a change associated with a portion of the environment and generate a simulated environment based on the modified map data. The evaluation system may then run a simulation, in the simulated environment, according to the original map data to determine a performance of the vehicle controller and/or a component thereof. In some examples, a single change or multiple changes may be included in the modified map data. Additionally, or accordingly, results from individual simulations may be amalgamated for further analysis of the vehicle controller.

The evaluation computing system may be configured to iteratively modify the map data to represent a plurality of changes and run simulations with any number of the plurality of changes. For example, the modified map data may represent a perturbed input to a component and/or subcomponent of the system, such as, for example, a semantic based localization component associated with a vehicle controller. Based on a determination that the vehicle controller and/or component does not detect and/or mitigate the change in a sufficient manner, the evaluation computing system may determine an error associated with the vehicle controller and/or the component. Based on a determination that the vehicle controller and/or the component detects and/or mitigates the change in a sufficient manner, the evaluation computing system may validate the vehicle controller and/or the component. In some examples, responsive to validation, the vehicle controller and/or the component may be incorporated into the vehicle.

In some examples, the evaluation computing system may determine to evaluate the performance of a vehicle controller or component thereof. The evaluation may be performed periodically, such as daily, weekly, or the like, and/or may be performed in response to a triggering event, such as when the vehicle is out of service, when the vehicle is charging, when the vehicle is being serviced, when requested by a technician or administrator, or the like. In such examples, the evaluation computing system may be configured to validate updates (e.g., software, hardware, etc.) made to the vehicle controller or the component between evaluations. For example, one or more developers may update different portions of code associated with a vehicle controller throughout a workday. The evaluation computing system may be configured to evaluate the performance of the updated vehicle controller daily (or at other regular or irregular intervals) to verify that the updated vehicle controller operates within parameters, such as prior to incorporating the updated vehicle controller in a vehicle.

In some examples, the evaluation computing system may evaluate the performance of the vehicle controller based on a request to validate the vehicle controller or the component. In some examples, the request may be received, such as from a user computing device, responsive to an update to the vehicle controller or the component. For example, a software developer may modify software code associated with a localization component of the vehicle controller. The software developer may submit a request to validate the updated localization component (e.g., vehicle controller), such as to verify that the updated localization component will operate within parameters (e.g., detect and/or mitigate a change in a sufficient manner). Additionally, or alternatively, the request may be received, such as from a user computing device, responsive to an indication of an anomaly, such as, for example, a high level of variance associated with one or more detections associated with a portion of an environment. For example, historical log data associated with vehicles under control of one or more vehicle controllers may be accessed and analyzed to determine portions of the log data representing detections (e.g., landmarks) having a high variance. In some examples, this may be the result of an obstructed and/or obscured field-of-view associated with one or more sensors of the vehicle, a systematic fault associated with the vehicle control system, and/or an unaccounted change to the physical environment (e.g., a construction zone where streetlights and/or lane markings may be shifted, rotated, added, and/or removed).

In some examples, the evaluation computing system may be configured to determine an update to the vehicle controller and automatically evaluate the updated vehicle controller based on the update. In some examples, the evaluation computing system may determine the update based on metadata associated with the vehicle controller or component thereof. The metadata may include a label (e.g., a name, a version, etc.), a timestamp (e.g., last saved, last updated, etc.), or the like. In some examples, the evaluation computing system may continuously and/or periodically (e.g., hourly, daily, etc.) evaluate the metadata for changes from a previous version of the vehicle controller and/or the component. Based on a determination that the metadata represents an update to the vehicle controller and/or the component, the evaluation computing system may automatically determine to evaluate the updated vehicle controller and/or the updated component.

Additionally, or alternatively, the evaluation computing system may be configured to determine an anomaly associated with a portion of an environment and automatically evaluate the vehicle controller using scenarios configured to recreate the anomaly. In some examples, the evaluation system may determine the anomaly based on log data associated with a previous operation of the vehicle controller controlling a vehicle in an environment. The log data may include an indication of a variation between map data associated with the environment and what was actually perceived by the vehicle while traversing the environment. In some examples, the variation may include a variance that is higher than a threshold variance (e.g., an average) associated with previously detected anomalies in the environment. Based on a determination that the log data represents an anomaly associated with a specific portion of an environment, the evaluation computing system may automatically determine to evaluate the vehicle controller and/or component with simulated scenarios based on the detected anomaly.

In some examples, the evaluation computing system may access log data associated with a previous operation of a vehicle controller controlling a vehicle in an environment. The log data may represent data input into the components and/or subcomponents of the vehicle controller, such as from one or more sensors of the vehicle or from an upstream component and/or an upstream subcomponent (e.g., component or subcomponent that receives and processes data prior to a particular component or subcomponent). Additionally, the log data may include data output (e.g., processed) by the components and/or the subcomponents, such as based on the input data. For example, the log data may include sensor data captured by one or more sensors of the vehicle and utilized by the vehicle controller to determine a location of the vehicle and a trajectory for the vehicle to travel through the environment, as well as control signals used to control the vehicle according to the trajectory.

Additionally, or alternatively, the evaluation computing system may access map data associated with a previous operation of a vehicle controller controlling a vehicle in an environment. In some examples, the map data can include data about semantic objects (also referred to herein as "objects") in an environment. Such objects can include "generic" features such as traffic lights, lane markings, and the like. The vehicle can use a sensor, such as an image sensor, to capture sensor data representing an environment. The objects can be detected in the sensor data. Rays can be determined in a three-dimensional environment based on the detected object and a pose of a vehicle and/or a pose of a sensor of the vehicle, the plurality of rays being cast into the three-dimensional environment. Intersections between the rays can be determined. The intersections can be utilized to determine candidate landmarks in the environment. However, not all candidates may represent actual landmarks in the environment. As such, the candidate landmarks can be utilized to determine landmarks and to eliminate other candidate landmarks. In some examples, the techniques described herein may be used to identify a landmark as a particular type of landmark from among a plurality of types of landmarks. The landmarks can be utilized to determine three-dimensional locations of objects associated with the candidate landmarks. Such refined landmarks can be used in various applications, such as mapping, localization, odometry, and the like. The map data can be determined based on the three-dimensional locations and transmitted to vehicles in the environment. The map data can be utilized to localize the vehicles.

In some examples, the components of the vehicle controller may include a perception component, a localization component, a prediction component, and a planner component. In some examples, any component of the vehicle controller may include one or more subcomponents that are individually modifiable, such as in an update to software associated therewith. As a non-limiting example, the localization component may include a global position solver, a smooth position solver, and a state solver, any of which being configured to be updated, such as by a software developer. Though examples associated with the subcomponents of the localization component are described throughout this disclosure, this is not intended to be so limiting and a person skilled in the art would understand that other components of the vehicle controller (e.g., perception component, prediction component, planner component, etc.) may include various subcomponents that may be modified and/or evaluated utilizing the techniques described herein.

In some examples, the evaluation computing system may access the log data and/or the map data to generate a simulated environment at least partially corresponding to a physical environment represented by the log data. In some examples, the evaluation computing system may modify the map data to generate modified map data. For example, the log data may be associated with an autonomous vehicle operating in a physical environment, and the evaluation system may access map data associated with the physical environment. The evaluation system may then modify the map data to generate modified map data representative of a simulated change associated with a portion of the physical environment (e.g., representative of a portion of the physical environment that may have been flagged as an anomaly). In some examples, the simulated change may include a shift, a rotation, an addition, and/or a removal of one or more landmarks (e.g., lane markings, traffic signals, poles, signs, mailboxes, fire hydrants, parking meters, etc.) associated with the physical environment. For example, the evaluation computing system may determine to change a portion of the physical environment corresponding to a 4-way intersection comprising 4 streetlights (e.g., one at each lane of the intersection), and may configure the change as a shift to all of the streetlights a fixed distance (e.g., 1 meter) in a direction (e.g., west). Such an example may represent a potential scenario an autonomous vehicle may encounter at a construction zone where streetlights may be required to be moved, while the original lane markings remain, for example.

In some examples, the evaluation computing system may utilize the log data and the modified map data to generate a simulated environment representing the physical environment and including the simulated change associated with the portion of the physical environment. That is, the simulated environment may be configured as a recreation of the physical environment if the simulated change were present in the physical environment (e.g., the physical environment including the example construction zone scenario previously discussed). The evaluation computing system may then execute various simulations of a simulated autonomous vehicle traversing the simulated environment, including the simulated change, under control of the simulated vehicle controller. Additionally, or alternatively, the evaluation computing system may analyze log data to determine a detection associated with the physical environment. The evaluation computing system may then map a position, corresponding to the detection associated with the physical environment, to the original map data. In some examples, the evaluation computing system may determine a semantic class associated with the detection based on the log data, and then may determine a distance threshold associated with the detection based on the semantic class. The distance threshold may define the portion of the physical environment where the change will be implemented.

As previously mentioned, the evaluation computing system may access log data associated with a previous operation of an autonomous vehicle, and the log data may indicate a trajectory of the vehicle traversing a physical environment. During the simulation, the evaluation computing system may determine a simulated trajectory for the simulated vehicle controller to control the simulated vehicle to traverse the simulated environment. For example, the log data and associated original map data may correspond to a straight roadway having two lanes, and the vehicle trajectory may indicate that the vehicle traveled in a straight line, parallel to the lanes. In some examples, the simulated environment may be generated based on modified map data representing a simulated change to a portion of the physical environment that corresponds to the straight roadway. For example, the change may comprise a rotation of the lane markings in a first rotational direction (e.g., clockwise) by a first rotation angle (e.g., 10 degrees). During such a simulation, the simulated vehicle controller may control the simulated autonomous vehicle according to the original map data that does not reflect the simulated change associated with the portion of the environment. For example, the simulated change may represent a perturbed input to a component and/or subcomponent of the system, such as, for example, a semantic based localization component associated with the simulated vehicle controller. As such, the simulated vehicle controller may be evaluated based on the simulated trajectory as determined using the original map data. In some examples, while traversing the portion of the environment including the simulated change, the simulated trajectory determined by the simulated vehicle controller may deviate from the actual trajectory of the vehicle (e.g., to maintain position of the simulated vehicle in the now rotated lane markings). As previously mentioned, the evaluation computing system may execute any number of simulations and evaluate the results of such simulations to evaluate the vehicle controller in detecting and/or mitigating the simulated change associated with the portion of the environment.

In some examples, the evaluation computing system may evaluate the simulated motion of the simulated vehicle controller controlling the simulated vehicle according to the simulated trajectory in the simulated environment. The evaluation computing system may be configured to determine a position of the vehicle in the log data and/or a simulated position of the simulated vehicle in the simulation at various points in time that correspond (e.g., a simulated point in time that corresponds to an actual point in time of the vehicle traversing the environment). For example, the evaluation computing system may determine a first position of the vehicle in the log data at a first time and a second position of the simulated vehicle in the simulation at a second time that corresponds to the first time. With positions of the vehicle traversing the environment and the simulated vehicle traversing the simulated environment determined at various points in time, the evaluation computing system may be configured to determine a difference between the respective positions.

In some examples, the evaluation computing system may be configured to determine a difference between the respective positions of the vehicle traversing the environment and the simulated vehicle traversing the simulated environment. For example, in the scenario described above, including the original environment with the straight roadway having two lanes and the simulated environment representing the simulated change to the portion of the original environment including the rotation of the straight roadway, the simulated vehicle controller may control the simulated vehicle according to the simulated trajectory, as previously described. Following the simulated trajectory, a simulated position of the simulated vehicle may deviate from the original trajectory of the vehicle traversing the environment to navigate through the portion of the simulated environment including the simulated change. For example, the simulated vehicle controller may determine a simulate trajectory that deviates from the trajectory by an amount (e.g., a clockwise rotation by 10 degrees) to follow the rotated lane markings and avoid crossing over into oncoming traffic. The evaluation computing system may compare a simulated position of the simulated vehicle at a simulated point in time while the simulated vehicle is navigating the simulated change. The evaluation computing system may determine a difference of the simulated position as compared to the actual position of the vehicle traversing the environment without the change to evaluate how the simulated vehicle controller detects and/or mitigates the change between the original map data and the simulated environment.

In some examples, the evaluation computing system may determine whether the simulated vehicle controller is valid or invalid based on the difference between the simulated position of the simulated vehicle traversing the simulated environment and the actual position of the vehicle traversing the environment. In some examples, the evaluation computing system may determine a threshold difference based on the simulated change. For example, if the simulated change includes a rotation by a rotation angle amount (e.g., 10 degrees) to a landmark (e.g., lane markings, traffic signals, poles, signs, mailboxes, fire hydrants, parking meters, etc.), the threshold difference may correspond to a position along a trajectory that deviates from an original trajectory by the rotation angle amount, or sufficiently close thereto. Additionally, or alternatively, if the simulated change includes a shift by a specified distance in a specified direction (e.g., an east shift by 5 meters) to a landmark, the threshold distance may correspond to a position along a trajectory that deviates from an original trajectory by the specified distance in the specified direction, or sufficiently close thereto. In some examples, the evaluation computing system may determine that the difference between the actual position and the simulated position satisfies the threshold distance (e.g., is within a threshold range of the threshold distance), then the evaluation computing system may determine that the vehicle controller has handled the simulated change in a sufficient manner, and may determine that the vehicle controller is valid. Alternatively, the evaluation computing system may determine that the difference between the actual position and the simulated position does not satisfy the threshold distance (e.g., is outside of a threshold range of the threshold distance), then the evaluation computing system may determine that the vehicle controller has not handled the simulated change in a sufficient manner, and may determine that the vehicle controller is invalid.

The techniques discussed herein may improve the functioning of an autonomous and/or semi-autonomous vehicle in many ways. For example, the techniques discussed herein may provide simulations for testing a performance of a component of a vehicle controller (e.g., one or more components of a localization system, including a semantic-based localization component), to ensure that the vehicle controller may safely operate in a dynamic environment. In some examples, the vehicle controller may be configured as a monitor operating on an autonomous vehicle, and following validation, the vehicle controller (or component thereof) may be enabled for control of the autonomous vehicle. Additionally, or alternatively, the techniques described herein may provide simulations for testing systematic errors occurring in simulations (e.g., a portion of the environment including landmarks representing a similar error) and evaluating a vehicle controllers ability to detect and/or mitigate the systematic error. As such, the techniques described herein may allow for evaluation of how a vehicle controller responds to unpredicted systematic errors. As may be understood, testing scenarios representing unpredicted systematic errors may improve safety outcomes, particularly in the context of vehicles and autonomous vehicles. Thus, the techniques described herein may improve a functioning of a computing device as well as improve safety outcomes.

Additionally, once a fault, such as, for example, a systematic error, has been detected, the outputs from a component of the system, such as, the semantic based localization component of the vehicle controller, may be utilized to further tune and/or adjust the operation of additional components, such that the vehicle controller may take different reactions (e.g., more favorable reactions) in future scenarios to a similar fault. For example, based on the output, one or more additional outputs from one or more additional components may be ignored and/or prioritized over another, such that the system may determine a reaction, differing from the initial reaction when the fault was first encountered.

Furthermore, the techniques described herein can provide a means by which the vehicle controller handles a simulated environment which deviates from a provided map of the environment (e.g., a construction zone altering landmarks). Testing of such scenarios allow the vehicle controller to be validated for handling such situations, resulting in increased accuracy while navigating construction zones, which are often unmarked and encountered without warning, resulting in an improvement to vehicle safety of autonomous vehicle control systems.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 illustrates a pictorial flow diagram of an example process 100 for evaluating a performance of a vehicle controller in detecting a simulated change to aspects of a map of a physical environment, in accordance with examples of the disclosure. The vehicle controller may be configured to control one or more functionalities of a vehicle operating in an environment. In at least one example, the vehicle controller may include an autonomous controller configured to control functionalities of an autonomous and/ or semi-autonomous vehicle.

An operation 102, an evaluation computing system may receive log data, associated with a vehicle 106 operating in a physical environment 108. The log data may include observed data observed and/or perceived by the vehicle 106 (e.g., sensor data), such as data identifying characteristics of the environment, entities and/or objects, detected within the proximity of and/or within a point of view of the vehicle 106. The sensor data can include image data representing object(s) (e.g., a landmark) in the environment. Additionally, or alternatively, the log data may represent lidar data, radar data, audio data, time of flight data, and the like. Although the image data is utilized to determine the three-dimensional location(s) as discussed in this disclosure, it is not limited as such. Any type of data (e.g., lidar data, radar data, audio data, time of flight data, etc.) can be used in a similar way as for the image data as discussed through the disclosure. The sensor data can include any number and type of objects. Further, the log data may include sensor data received from a single sensor or multiple sensors. In some examples, the log data can include sensor data from a vehicle and/or other vehicles. Each of the vehicle and/or the other vehicles can include the single sensor or the multiple sensors. Such log data may further comprise messages by or between components/subcomponents of the vehicle including, for instance, published states of components (ESC, HVAC, battery SOC, ABS, various electronic control units, etc.), derived data generated between components, actuation commands issued to components (e.g., acceleration commands, braking commands, steering commands, etc.), and the like.

An example 104 illustrates a vehicle 106 operating in a physical environment. The log data may represent various detections made by the sensors of the vehicle 106, such as, for example, detections of landmarks (e.g., lane markings, traffic signals, poles, signs, mailboxes, fire hydrants, parking meters, etc.).

In some instances, the vehicle 106 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 106 can be a fully or partially autonomous vehicle having any other level or classification. Moreover, in some instances, the techniques described herein can be usable by non-autonomous vehicles as well.

The sensor data can include image data received from the vehicle 106. The image data can be received from a single sensor or multiple sensors of the vehicle 106. The image data can be associated with a single time (or sensor data associated with substantially the same time, based on technical tolerances) or image data captured over a period of time. The sensor data can be associated with a pose of the vehicle (x, y, z, yaw, pitch, roll) and/or a pose of the sensor (x, y, z, yaw, pitch, roll, orientation, field of view, etc.). In some examples, the pose of the sensor can include a pose of the sensor associated with the world. The pose of the sensor associated with the world can include a pose (e.g., also referred to as "pose of the sensor") that is a combination of a vehicle pose associated with the world and a sensor pose associated with the vehicle.

At operation 110, the evaluation computing system may receive map data associated with the physical environment 108. In some examples, the map data may be determined based at least in part on the log data. For example, the map data may be determined by various determinations and operations associated with the sensor data. Examples of using log data and/or sensor data to determine map data are discussed in, for example, U.S. patent application Ser. No. 17/334,190 titled "Determining Data for Semantic Localization" and filed May 28, 2021, which is incorporated by reference herein in its entirety for all purposes.

At operation 112, the evaluation computing system may modify the map data to generate modified map data representative of a change associated with a portion of the physical environment. In some examples, the evaluation computing system may utilize the modified map data to generate a simulated environment including the simulated change associated with the portion of the physical environment. In some examples, the change may be configured as a systematic change in that detections of landmarks associated with the portion of the physical environment may be similarly changed. In some examples, objects associated with a first semantic class may be changed while objects associated with a second semantic class may be unchanged. In some examples, the simulated change may include a shift, a rotation, an addition, and/or a removal of one or more landmarks associated with the physical environment.

An example 114 illustrates the map data 116 and the simulated change 118. The map data 116 and the simulated change 118 may be utilized together to generate modified map data 120. In some examples, the evaluation computing system may utilize the modified map data 120 to generate a simulated environment 122 representing the physical environment 108 including the simulated change 118. In some examples, the simulated change 118 may be configured to only affect a semantic based localization system (or other aspect of a localization system that determines a location based on IMU data, GPS data, wheel encoder data, lidar data (localizing relative to a mesh or lidar based map), image data (localizing relative to a semantic based or visual based map), and the like) associated with the simulated vehicle controller. Additionally, or alternatively, the semantic based localization system may include visual semantic components as an input.

At operation 124, as previously mentioned, the evaluation computing system may generate a simulated environment representing the physical environment including the simulated change associated with the portion of the physical environment. That is, the simulated environment may be configured as a recreation of the physical environment if the simulated change were present in the physical environment. In some examples, the evaluation computing system may analyze the log data to determine a detection associated with the physical environment 108. The evaluation computing system may then map a position, corresponding to the detection associated with the physical environment 108, to the original map data. In some examples, the evaluation computing system may determine a semantic class associated with the detection based on the log data, and then may determine a distance threshold associated with the detection based on the semantic class. The distance threshold may define the portion of the physical environment 108 where the simulated change may be implemented.

At operation 126, the evaluation computing system may determine a simulated trajectory for a simulated vehicle controller to traverse the simulated environment 122. In some examples, the simulated trajectory may be at least partially based on the original map data and/or a detection of the simulated change in the simulated environment.

An example of the physical environment 108 may include the vehicle 106 and a landmark, such as, for example, a streetlight 128. As illustrated, the streetlight 128 may be positioned to the side of a roadway and hang over a portion of the roadway. In such an example while traversing the physical environment 108, the vehicle 106 may follow a trajectory 130 to navigate through the illustrated intersection.

An example of the simulated environment 122 may include a simulated vehicle 132 and a simulated landmark, such as, for example, a simulated streetlight 134 corresponding to the actual streetlight 128. In some examples, the simulated streetlight 134 may be included in the portion of the physical environment associated with the simulated change. For example, as illustrated, the simulated streetlight 134 has undergone a simulated change in the simulated environment 122, shifting the simulated streetlight 134 a distance (e.g., 1 meter) in a direction (e.g., west) from the original position of the streetlight 128 in the physical environment 108. As illustrated, the simulated streetlight 134 may be positioned in a portion of the roadway and hang over an additional portion of the roadway. As such, while traversing the simulated environment 122 including the simulated change, the simulated vehicle 132 may follow a simulated trajectory 136 to navigate through the illustrated intersection while mitigating the simulated change. For example, the simulated trajectory 136 may begin on the same line as the original trajectory 130, but may deviate from the original trajectory 130 to avoid the simulated streetlight 134 that is now positioned in the roadway, and then return to an endpoint of the original trajectory 130.

At operation 138, the evaluation computing system may evaluate the simulated motion of the simulated vehicle controller controlling the simulated vehicle 132 according to the simulated trajectory 136 in the simulated environment 122. The evaluation computing system may be configured to determine a position of the vehicle 106 in the log data and/or a simulated position of the simulated vehicle 132 in the simulation at various points in time that correspond (e.g., a simulated point in time that corresponds to an actual point in time of the vehicle 106 traversing the environment 108). For example, the evaluation computing system may determine a first position of the vehicle 106 in the log data at a first time and a second position of the simulated vehicle 132 in the simulation at a second time that corresponds to the first time. With positions of the vehicle 106 traversing the environment 108 and the simulated vehicle 132 traversing the simulated environment 122 determined at various points in time, the evaluation computing system may be configured to determine a difference between the respective positions.

At operation 140, the evaluation computing system may be configured to determine a difference between a trajectory and/or a location determined using lidar-based localization component (e.g., reflecting an accurate representation of the physical environment) and a trajectory and/or a location determined using a visual semantic-based localization component (e.g., reflecting a perturbed representation of the physical environment including the simulated change. For example, the evaluation computing system may be configured to determine a difference between the respective positions of the vehicle 106 traversing the environment 108 and the simulated vehicle 132 traversing the simulated environment 122. For example, the simulated vehicle controller may control the simulated vehicle 132 according to the simulated trajectory 136, as previously described. Following the simulated trajectory 136, a simulated position of the simulated vehicle 132 may deviate from the original trajectory 130 of the vehicle 106 traversing the environment 108 to navigate through the portion of the simulated environment 122 including the simulated change. For example, the simulated vehicle controller may determine a simulated trajectory 136 that deviates from the trajectory 130 by an amount (e.g., a west shift by 1 meter) to avoid the simulated streetlight 134 that has been shifted west by 1 meter from the original streetlight 128.

An example 142 illustrates how the evaluation computing system may compare an actual position 144 of the vehicle 106 at an actual point in time traversing the physical environment 108 according to the original trajectory 130 to a simulated position 146 of the simulated vehicle 132 at a simulated point in time corresponding to the actual point in time while the simulated vehicle 132 is navigating the simulated change 118. The evaluation computing system may determine a difference 148 of the simulated position 146 of the simulated vehicle 132 as compared to the actual position 144 of the vehicle 106 traversing the environment 108 without the simulated change 118 to evaluate how the simulated vehicle controller detects and/or mitigates the simulated change 118 between the original map data 116 and the simulated environment 122.

At operation 150, the evaluation computing system may determine whether the simulated vehicle controller is valid or invalid based on the difference 148 between the simulated position 146 of the simulated vehicle 132 traversing the simulated environment 122 and the actual position 144 of the vehicle 106 traversing the environment 108. In some examples, the evaluation computing system may determine a threshold difference based on the simulated change 118. For example, as illustrated, the simulated change 118 includes a shift in a direction (e.g., west) by a distance (e.g., 1 meter) to the simulated streetlight 134. As such, the threshold difference may correspond to an estimated position along an estimated trajectory that deviates from an original trajectory by the shift distance, or sufficiently close thereto. Additionally, or alternatively, as further described with respect to FIGS. 2A-2C, if the simulated change includes a rotation by a rotation angle amount (e.g., 10 degrees) to a landmark, the threshold difference may correspond to an estimated position along an estimated trajectory that deviates from an original trajectory by the rotation angle amount, or sufficiently close thereto.

In some examples, the evaluation computing system may determine that the difference between the actual position and the simulated position satisfies the threshold distance (e.g., is within a threshold range of the threshold distance), then the evaluation computing system may determine that the vehicle controller has handled the simulated change in a sufficient manner, and may determine that the vehicle controller is valid. Alternatively, the evaluation computing system may determine that the difference between the actual position and the simulated position does not satisfy the threshold distance (e.g., is outside of a threshold range of the threshold distance), then the evaluation computing system may determine that the vehicle controller has not handled the simulated change in a sufficient manner, and may determine that the vehicle controller is invalid.

Based on a determination that the difference 148 between the actual position 144 and the simulated position 146 satisfies the threshold distance, (e.g., is within a threshold range of the threshold distance), then the evaluation computing system, at operation 152 may determine that the vehicle controller has handled the simulated change 118 in a sufficient manner, and may determine that the vehicle controller is valid. In some examples, responsive to receiving an indication of validity, the evaluation computing system may cause the vehicle controller and/or component thereof to be incorporated into one or more autonomous vehicle(s). Alternatively, based on a determination that the difference 148 between the actual position 144 and the simulated position 146 does not satisfy the threshold distance, (e.g., is not within a threshold range of the threshold distance), then the evaluation computing system, at operation 154 may determine that the vehicle controller has not handled the simulated change 118 in a sufficient manner, and may determine that the vehicle controller is invalid.

Using the disclosed techniques, the robustness of a vehicle's autonomous systems can be characterized and/or tested. For example, a systematic fault, such as a static simulated change 118 to a portion of an environment 108 can be injected into map data 116 and used to generate a simulated environment 122 representing the simulated change 118 for executing simulations to test the ability of the simulated vehicle controller to detect and/or mitigate the simulated change 118. For example, the ability of a perception system to correctly characterize an object in an environment despite the deviation (e.g., the simulated change 118) from utilized map data 116 can be characterized. As another example, the ability of an autonomous vehicle (e.g., the simulated vehicle 132) to accurately detect its pose within a simulated environment 122 can be characterized despite the aforementioned simulated change 118 included in the simulated environment 122.

FIG. 2A illustrates an example 200 of a vehicle 106 traversing a physical environment. In some examples, example 200 may correspond to original or actual map data associated with the physical environment. In some examples, the example 200 may correspond to log data associated with operation of the vehicle 106 traversing the environment. The original map data may include one or more object(s), such as, for example, landmarks and/or lane markings. In some examples, the map data may include a landmark, such as, for example a sign 202, and one or more lane markings, such as, for example, a first lane marking 204a (e.g., defining a first shoulder of a roadway), a second lane marking 204b (e.g., defining a centerline and dividing two lanes of a roadway), and/or a third lane marking 204c (e.g., defining a second should of a roadway).

As illustrated in the example 200, the vehicle 106 may traverse the roadway of the environment according to a trajectory 206. The trajectory 206 may be determined based on the second lane marking 204b and the third lane marking 204c defining a first lane of the roadway. The trajectory 206 may be configured to maintain the vehicle 106 in the first lane of the roadway, such that the vehicle 106 does not cross over the second lane marking 204b and into the second lane defined by the first lane marking 204a and the second lane marking 204b. As previously described, the vehicle 106 may detect the lane markings 204 and use the detections to determine the trajectory 206.

FIG. 2B illustrates an example 210 of a simulated vehicle 132 traversing a simulated environment based on modified map data. In some examples, the example 210 may correspond to modified map data, determined based on original map data (e.g., the map data depicted in the example 200 illustrated in FIG. 2A) and a simulated change associated with a portion 212 of the environment. As illustrated, the landmarks (e.g., lane markings, traffic signals, poles, signs, mailboxes, fire hydrants, parking meters, etc.) included in the portion 212 of the environment may be subject to the simulated change. In some examples, only landmarks having a specific semantic class may be affected by the simulated change. In some examples, the techniques described herein may be utilized to inject faults (e.g., simulated changes to map data) to test real-world scenarios that may be potentially encountered. Take, for example, a roadway undergoing construction. The construction may cause the roadway to deviate from a traditional path to make room for the construction, for example, by rotating the lane by a rotational angle (e.g., 5 degrees) in a rotational direction (e.g., clockwise). Such a simulated change may be represented by rotating the original lane markings 204 in the portion 212 of the environment. The modified map data may include one or more object(s), such as, for example, landmarks. In some examples, the modified map data may include one or more landmarks, such as, for example, a sign 202, and one or more lane markings, such as, for example a first rotated lane marking 214a (e.g., defining a first shoulder of a roadway), a second rotated lane marking 214b (e.g., defining a centerline and dividing two lanes of a roadway), and/or a third rotated lane marking 214c (e.g., defining a second should of a roadway). As previously described, the simulated change may be configured to change only objects of a specific semantic class. In the example 210, the rotated lane markings 214 have been rotated from the original lane markings 204 of FIG. 2A, while the sign 202 has not been rotated from the original sign 202 of FIG. 2A.

As illustrated in the example 210, the simulated vehicle 132 may traverse the roadway of a simulated environment generated based on the modified map data. In some examples, the simulated vehicle 132 may traverse the roadway according to a simulated trajectory 216. The simulated trajectory 216 may be determined based on the second rotated lane marking 214b and the third rotated lane marking 214c defining a first lane of the roadway. The simulated trajectory 216 may deviate from the trajectory 206 of FIG. 2A to maintain the simulated vehicle 132 within the first lane of the roadway, such that the simulated vehicle 132 does not cross over the second rotated lane marking 214b and into the second lane defined by the first rotated lane marking 214a and the second rotated lane marking 214b. As previously described, the simulated vehicle controller controlling the simulated vehicle 132 may detect the rotated lane markings 214 and use the detections to determine the simulated trajectory 216.

As can be seen in 210 of FIG. 2B when compared to 200 of FIG. 2A, the simulated trajectory 216 may deviate from the original trajectory 206 of the vehicle 106 as indicated by the log data. The evaluation computing system may determine one or more positions of the simulated vehicle 132 along the simulated trajectory 216 to determine a difference from a position of the vehicle 106 along the original trajectory 206 a corresponding point in time. The difference may be utilized to determine whether a component of simulated vehicle controller (e.g., a semantic localization component, lidar-based localization component, IMU based localization, etc.) is valid or invalid, using any of the techniques described herein, such as, for example, the techniques described with respect to FIG. 1.

FIG. 2C illustrates an example 220 of a simulated vehicle 132 traversing a simulated environment based on modified map data. In some examples, the example 210 may correspond to modified map data, determined based on original map data (e.g., the map data depicted in the example 200 illustrated in FIG. 2A) and a simulated change associated with a portion 222 of the environment. As illustrated, only the landmarks included in the portion 222 of the environment may be subject to the simulated change. Take, for example, a roadway undergoing construction. The construction may cause the roadway to deviate from a traditional path to make room for the construction, for example, by rotating the lane by a rotational angle (e.g., 5 degrees) in a rotational direction (e.g., clockwise). Such a simulated change may be represented by including added lane markings 224 imposed over the original lane markings 204 in the portion 212 of the environment. The modified map data may include one or more landmark(s). In some examples, the modified map data may include one or more landmarks, such as, for example, a sign 202, and one or more lane markings, such as, for example a first added lane marking 224a (e.g., defining a first shoulder of a roadway), a second added lane marking 224b (e.g., defining a centerline and dividing two lanes of a roadway), and/or a third added lane marking 224c (e.g., defining a second should of a roadway). As previously described, the simulated change may be configured to change only objects of a specific semantic class. In the example 220, the added lane markings 224 have been imposed over the original lane markings 204 of FIG. 2A, while the sign 202 has not been affected by the change.

As illustrated in the example 220, the simulated vehicle 132 may traverse the roadway of a simulated environment generated based on the modified map data. In some examples, the simulated vehicle 132 may traverse the roadway according to a simulated trajectory 226. The simulated trajectory 226 may be determined based on the second new lane marking 224b and the third new lane marking 224c defining a first lane of the roadway. The simulated trajectory 226 may deviate from the trajectory 206 of FIG. 2A to maintain the simulated vehicle 132 within the first lane of the roadway, such that the simulated vehicle 132 does not cross over the second added lane marking 224b and into the second lane defined by the first added lane marking 224a and the second added lane marking 224b. As previously described, the simulated vehicle controller controlling the simulated vehicle 132 may detect the added lane markings 224 and use the detections to determine the simulated trajectory 226.

As can be seen in 220 of FIG. 2B when compared to 200 of FIG. 2A, the simulated trajectory 226 may deviate from the original trajectory 206, of the vehicle 106 as indicated by the log data, in a similar manner to the simulated trajectory 216 as illustrated in 210 of FIG. 2B. The evaluation computing system may determine one or more positions of the simulated vehicle 132 along the simulated trajectory 226 to determine a difference from a position of the vehicle 106 along the original trajectory 206 a corresponding point in time. The difference may be utilized to determine whether the simulated vehicle controller is valid or invalid, using any of the techniques described herein, such as, for example, the techniques described with respect to FIG. 1.

Figures 3A, 3B, 3C:
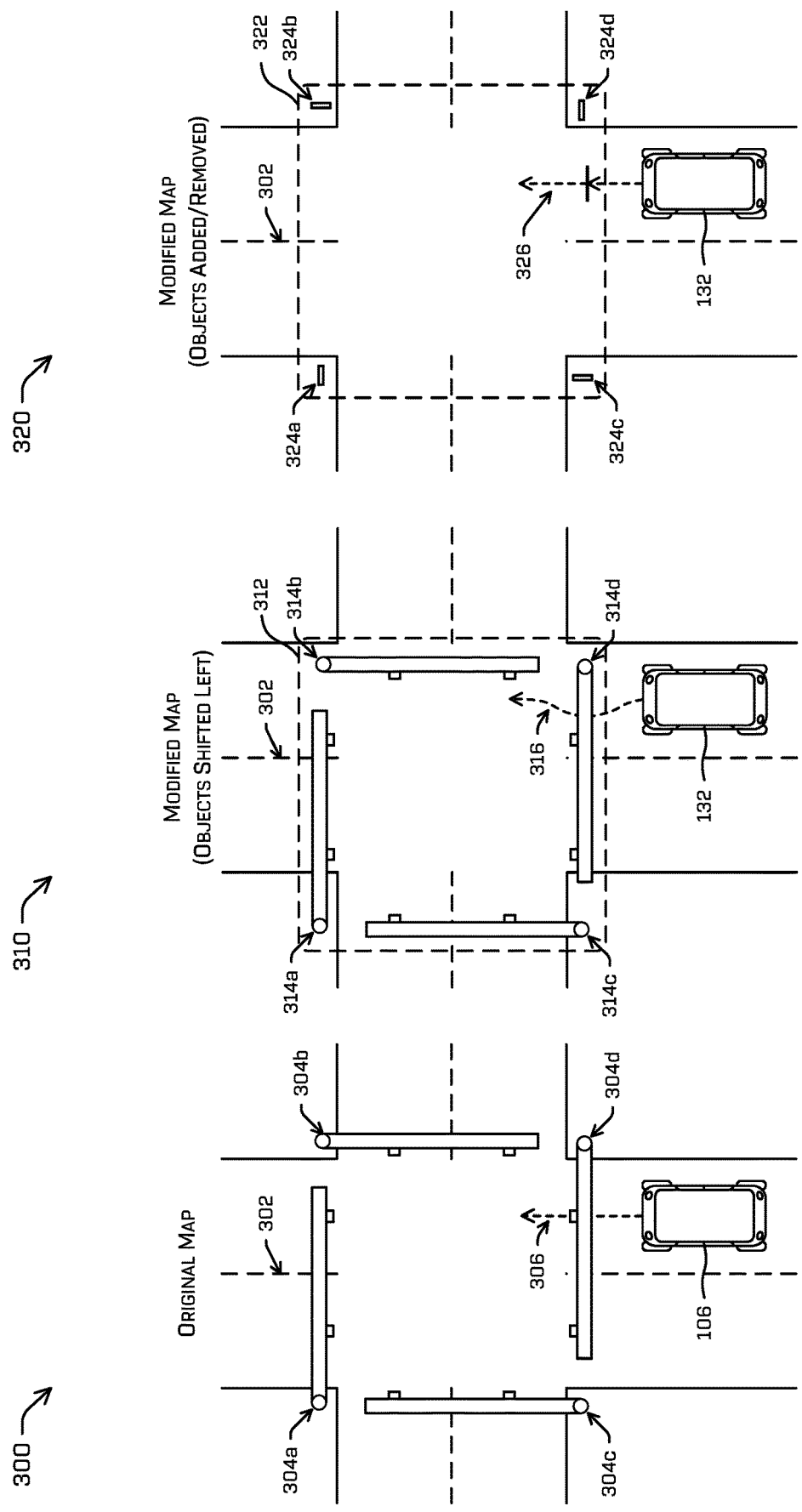
FIG. 3A illustrates an example scenario of a vehicle traversing a physical environment.
FIG. 3B illustrates an example scenario of a simulated vehicle traversing a simulated environment based on modified map data.
FIG. 3C illustrates an example scenario of a simulated vehicle traversing a simulated environment based on modified map data.

FIG. 3A illustrates an example 300 of a vehicle 106 traversing a physical environment. In some examples, example 300 may correspond to original or actual map data associated with a physical environment. In some examples, the example 300 may correspond to log data associated with operation of the vehicle 106 traversing the environment. The original map data may include one or more landmark(s). In some examples, the map data may include one or more landmarks represented by lane markings, such as, for example lane markings 302 (e.g., all of the lane markings included in the intersection illustrated by example 300), and one or more landmarks, such as, for example, a first streetlight 304a, a second streetlight 304b, a third streetlight 304c, and/or a fourth streetlight 304d.

As illustrated in example 300, the vehicle 106 may traverse the roadway of the environment according to a trajectory 306. The trajectory 306 may be determined based on one or more of the lane markings 302 and/or landmarks 304. For example, the trajectory 306 may be configured to navigate the vehicle 106 straight through the intersection illustrated in example 300. Take for example, the first streetlight 304a (instructing the traffic approaching the intersection from the same direction as the vehicle 106) being in a state allowing the vehicle to travel through the intersection (e.g., displaying a green light). Additionally, the lane markings 302 may define a first lane for the vehicle 106 to travel in such that the vehicle 106 does not cross over the lane markings 302 and into a second lane. The vehicle controller may use the data gathered from the first streetlight 304a and the lane markings 302 to determine the trajectory 306 for controlling the vehicle through the intersection.

FIG. 3B illustrates an example 310 of a simulated vehicle 132 traversing a simulated environment based on modified map data. In some examples, example 310 may correspond to modified map data, determined based on the original map data (e.g., the map data depicted in the example 300 illustrated in FIG. 3A) and a simulated change associated with a portion 312 of the environment. As illustrated, the landmarks included in the portion 312 of the environment may be subject to the simulated change. In some examples, only landmarks having a specific semantic class may be affected by the simulated change. Take, for example, a roadway undergoing construction. The construction may cause impede a path of travel provided by the roadway to make room for the construction, for example, by shifting the streetlights by a distance (e.g., 1 meter) in a direction (e.g., west or left). Such a simulated change may be represented by shifting the original streetlights 304 in the portion 312 of the environment. The modified map data may include one or more landmark(s). In some examples, the modified map data may include one or more landmarks represented by lane markings, such as, for example lane markings 302 (e.g., all of the lane markings included in the intersection illustrated by example 310), and one or more landmarks, such as, for example, a first shifted streetlight 314a, a second shifted streetlight 314b, a third shifted streetlight 314c, and/or a fourth shifted streetlight 314d. As previously described, the simulated change may be configured to change only objects of a specific semantic class. In the example 310, the shifted streetlights 314 have been shifted from the original streetlights 304 of FIG. 3A, while lane markings 302 have not been shifted from the original lane markings 302 of FIG. 3A.

As illustrated in the example 310, the simulated vehicle 132 may traverse the roadway of a simulated environment generated based on the modified map data. In some examples, the simulated vehicle 132 may traverse the roadway according to a simulated trajectory 316. The simulated trajectory 316 may be determined based on one or more of the lane markings 302 and/or landmarks 314. For example, the trajectory 316 may be configured to navigate the simulated vehicle 132 straight through the intersection illustrated in example 310. Take for example, the first shifted streetlight 314a (instructing the traffic approaching the intersection from the same direction as the simulated vehicle 132) being in a state allowing the vehicle to travel through the intersection (e.g., displaying a green light). Additionally, the lane markings 302 may define a first lane for the simulated vehicle 132 to travel in such that the simulated vehicle 132 does not cross over the lane markings 302 and into a second lane. Additionally, the fourth shifted streetlight 314d may be positioned in a portion of the roadway and hang over an additional portion of the roadway. As such, while traversing the simulated intersection including the simulated change, the simulated vehicle 132 may follow a simulated trajectory 316 to navigate through the illustrated intersection while mitigating the simulated change. The vehicle controller may use the data gathered from the first shifted streetlight 314a, the fourth shifted streetlight 314d, and the lane markings 302 to determine the trajectory 306 for controlling the vehicle through the intersection. For example, the simulated trajectory 316 may begin on the same line as the original trajectory 306, but may deviate from the original trajectory 306 to avoid the fourth shifted streetlight 314d that is now positioned in the roadway, and then return to an endpoint of the original trajectory 306.

FIG. 3C illustrates an example 320 of a simulated vehicle 132 traversing a simulated environment based on modified map data. In some examples, example 310 may correspond to modified map data, determined based on the original map data (e.g., the map data depicted in the example 300 illustrated in FIG. 3A) and a simulated change associated with a portion 322 of the environment. As illustrated, the landmarks included in the portion 322 of the environment may be subject to the simulated change. In some examples, only landmarks having a specific semantic class may be affected by the simulated change. Take, for example, a roadway undergoing construction. The construction may cause the streetlights to be removed to make room for construction and stop signs may be added in place of the removed streetlights to control traffic at the intersection. Such a simulated change may be represented by removing the original streetlights 304 in the portion of the environment and adding stop signs 324 to the portion of the environment. The modified map data may include one or more landmark(s). In some examples, the modified map data may include one or more landmarks represented as lane markings, such as, for example lane markings 302 (e.g., all of the lane markings included in the intersection illustrated by example 320), and one or more landmarks, such as, for example, a first stop sign 324*a*, a second stop sign 324*b*, a third stop sign 324*c*, and/or a fourth stop sign 324*d*. As previously described, the simulated change may be configured to change only objects of a specific semantic class. In the example 320, the streetlights 304 of FIG. 3A have been removed and stop signs 324 have been added, while lane markings 302 have not been shifted from the original lane markings 302 of FIG. 3A.

As illustrated in the example 320, the simulated vehicle 132 may traverse the roadway of a simulated environment generated based on the modified map data. In some examples, the simulated vehicle 132 may traverse the roadway according to a simulated trajectory 326. The simulated trajectory 326 may be determined based on one or more of the lane markings 302 and/or landmarks 324. For example, the trajectory 326 may be configured to navigate the simulated vehicle 132 straight through the intersection illustrated in example 320. Take, for example, the fourth stop sign 324*d* instructing the traffic approaching the intersection from the same direction as the simulated vehicle 132 to stop before entering the intersection. Additionally, the lane markings 302 may define a first lane for the simulated vehicle 132 to travel in such that the simulated vehicle 132 does not cross over the lane markings 302 and into a second lane. As such, while traversing the simulated intersection including the simulated change, the simulated vehicle 132 may follow a simulated trajectory 326 to navigate through the illustrated intersection while mitigating the simulated change. The vehicle controller may use the data gathered from the fourth stop sign 324*d* and the lane markings 302 to determine the trajectory 326 for controlling the vehicle through the intersection. For example, the simulated trajectory 326 may begin on the same line as the original trajectory 306, but may deviate in motion to stop at the fourth stop sign 324*d* before continuing along the simulated trajectory 326 while remaining on the same path as the original trajectory 306.

Figure 4:
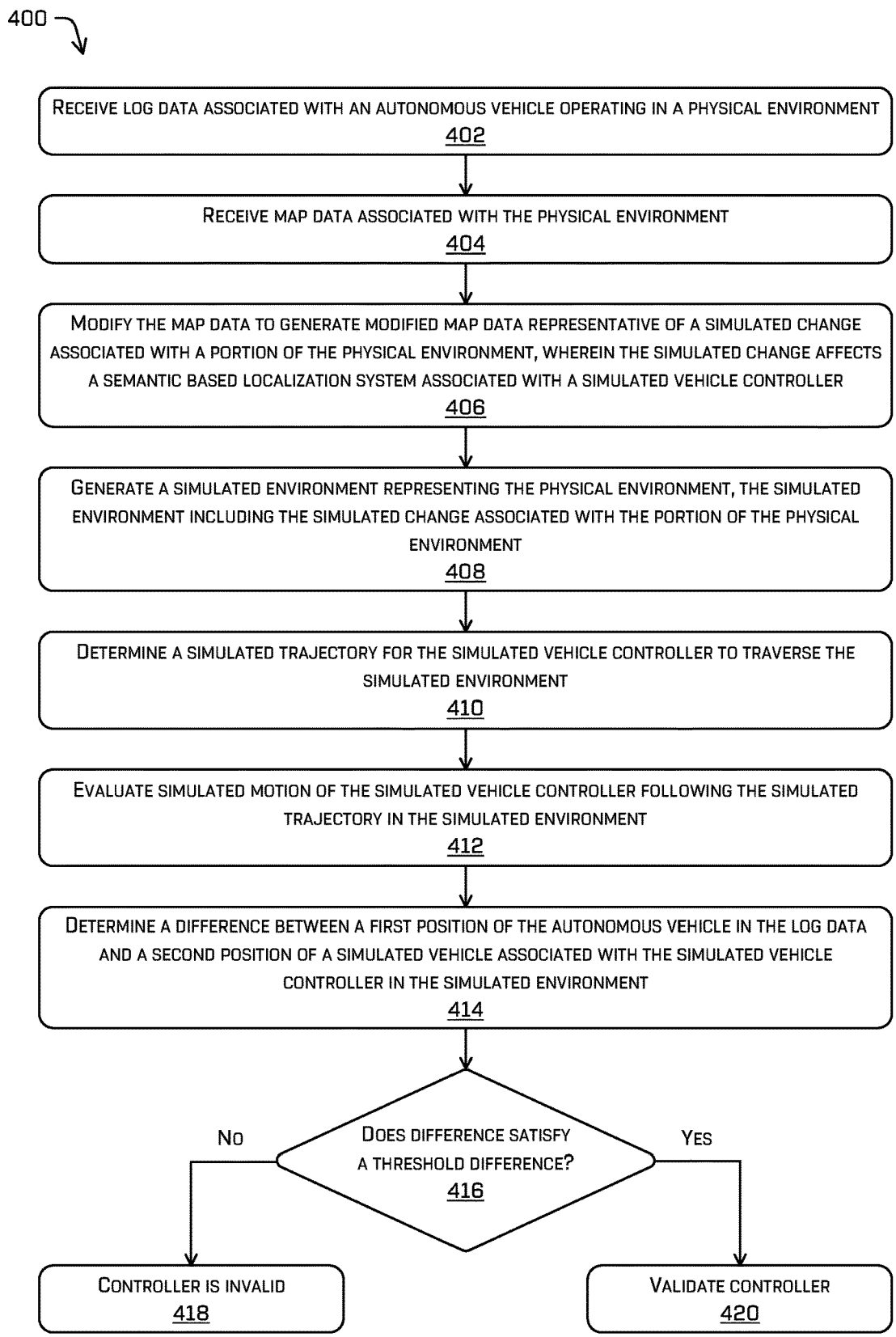
FIG. 4 illustrates an example process for evaluating a performance of a simulated vehicle controller in detecting a simulated change to aspects of a map of a physical environment.

FIGS. 1 and 4 illustrate example process(es) in accordance with examples of the disclosure. The process(es) are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 4 illustrates an example process 400 for evaluating a performance of a simulated vehicle controller in detecting a simulated change to aspects of a map of a physical environment.

The process 400 begins at operation 402 and includes receiving log data associated with an autonomous vehicle operating in a physical environment. In some examples, the log data may be the log data as described with respect to FIG. 1.

At operation 404, the process 400 may include receiving map data associated with the physical environment. In some examples, the log data may be utilized to determine a location of the vehicle in the physical environment, and based on the location, the map data may be accessed, received, and/or determined. In some examples, the map data may be the map data 116 as described with respect to FIG. 1.

At operation 406, the process 400 may include modifying the map data to generate modified map data representative of a simulated change associated with a portion of the physical environment. In some examples, the simulated change may affect a semantic based localization system associated with a simulated vehicle controller. In some examples, the semantic based localization system may provide input(s) to a global solver that determines localization information based on lidar data, IMU data, wheel encoder data, GPS data, image data, and the like. Additionally, or alternatively, the semantic based localization system may include visual semantic components configured as an input. In some examples, the simulated change and/or the modified map data may be the simulated change 118 and/or the modified map data 120 as described with respect to FIG. 1, respectively.

At operation 408, the process 400 may include generating, based at least in part on the log data and the modified map data, a simulated environment representing the physical environment, the simulated environment including the change associated with the portion of the physical environment. In some examples, as described herein, the simulated environment may be the simulated environment 122 as described with respect to FIG. 1.

At operation 410, the process 400 may include determining a simulated trajectory for a simulated vehicle controller to traverse the simulated environment. In some examples, the simulated trajectory may be configured to deviate from an original trajectory of the vehicle, as indicated by the log data, to navigate the simulated vehicle through the portion of the environment including the simulated change. In some examples, the simulated trajectory may be configured as the simulated trajectory 136, 216, 226, 316, and/or 326 as described with respect to FIGS. 1, 2B, 2C, 3B, and/or 3C.

At operation 412, the process 400 may include evaluating, as a simulation, simulated motion of the simulated vehicle controller following the simulated trajectory in the simulated environment. The evaluation computing system may be configured to determine a position of the vehicle in the log data and/or a simulated position of the simulated vehicle in the simulation at various points in time that correspond (e.g., a simulated point in time that corresponds to an actual point in time of the vehicle traversing the environment).

At operation 414, the process 400 may include determining, based on the simulation, a difference between a first position of the autonomous vehicle in the log data and a second position of a simulated vehicle associated with the simulated vehicle controller in the simulated environment. In some examples, the difference may correspond to the difference 148 as described with respect to FIG. 1.

At operation 416, the process 400 may include determining whether the difference between the first position of the autonomous vehicle in the log data and the second position of the simulated vehicle associated with the simulated vehicle controller in the simulated environment satisfies a threshold difference. In some examples, the threshold difference may be based at least in part on the simulated change associated with the portion of the physical environment. For example, if the simulated change includes a rotation by a rotation angle amount (e.g., 10 degrees) to a landmark, the threshold difference may correspond to a position along a trajectory that deviates from an original trajectory by the rotation angle amount, or sufficiently close thereto. If the process 400 determines that the difference between the first position and the second position does not satisfy the difference, the process 400 may proceed to operation 418. Alternatively, if the process 400 determines that the difference between the first position and the second position satisfies the threshold difference, the process 400 may proceed to operation 420.

At operation 418, the process 400 may include determining that the simulated vehicle controller is invalid.

At operation 420, the process 400 may include determining that the simulated vehicle controller is valid. In some examples, following validation of the simulated vehicle controller (or semantic localization component thereon), the system may send one or more instructions to the vehicle, vehicle controller, and/or components thereon. For example, the system may send an instruction to a vehicle to enable the simulated vehicle controller for control of the vehicle. Additionally, or alternatively, the system may send one or more instructions to ignore and/or prioritize one or more additional outputs from one or more additional components of the vehicle controller, such that, the vehicle controller may determine a reaction which differs from an initial reaction when the fault was first encountered.

Additionally, or alternatively, the process 400 may include determining, based at least in part on the log data, a detection associated with the physical environment. Additionally, or alternatively, the process 400 may include mapping a position to the map data based at least in part on the log data, the position corresponding to the detection associated with the physical environment. Additionally, or alternatively, the process 400 may include determining, based at least in part on the log data, a semantic class associated with the detection. Additionally, or alternatively, the process 400 may include determining a distance threshold associated with the detection based at least in part on the semantic class. Additionally, or alternatively, the process 400 may include determining the portion of the physical environment based at least in part on the distance threshold associated with the detection.

Additionally, or alternatively, the process 400 may include determining, based at least in part on the log data, a detection associated with the portion of the physical environment. Additionally, or alternatively, the process 400 may include determining a variance associated with the detection. Additionally, or alternatively, the process 400 may include determining that the variance associated with the detection satisfies a threshold variance. In some examples, modifying the map data to generate the modified map data representative of the simulated change associated with the portion of the physical environment may be based at least in part on determining that the variance associated with the detection associated with the portion of the environment satisfies the threshold variance.

In some examples, the simulated change may comprise rotating the portion of the physical environment in a first rotational direction by a first rotation angle. Additionally, or alternatively, the simulated change may comprise shifting the portion of the physical environment a first distance in a first direction.

In some examples, the simulated vehicle controller may comprise a visual localization component. Examples of simulated vehicle controllers comprising visual localization components are discussed in, for example, U.S. patent application Ser. No. 17/119,518 titled "Localization based on Semantic Objects" and filed on Dec. 11, 2020, which is herein incorporated by reference in its entirety and for all purposes.

In some examples, the map data may include at least one landmark. Additionally, or alternatively, the simulated change may comprise changing one of a position, an orientation, or a semantic type of one of the landmark marking in the modified map data. In some examples, a landmark may include a static detection, such as, for example, lane markings, traffic signals, poles, signs, mailboxes, fire hydrants, parking meters, and the like.

Additionally, or alternatively, the process 400 may include sending the simulated vehicle controller to the autonomous vehicle to control the autonomous vehicle.

Figure 5:
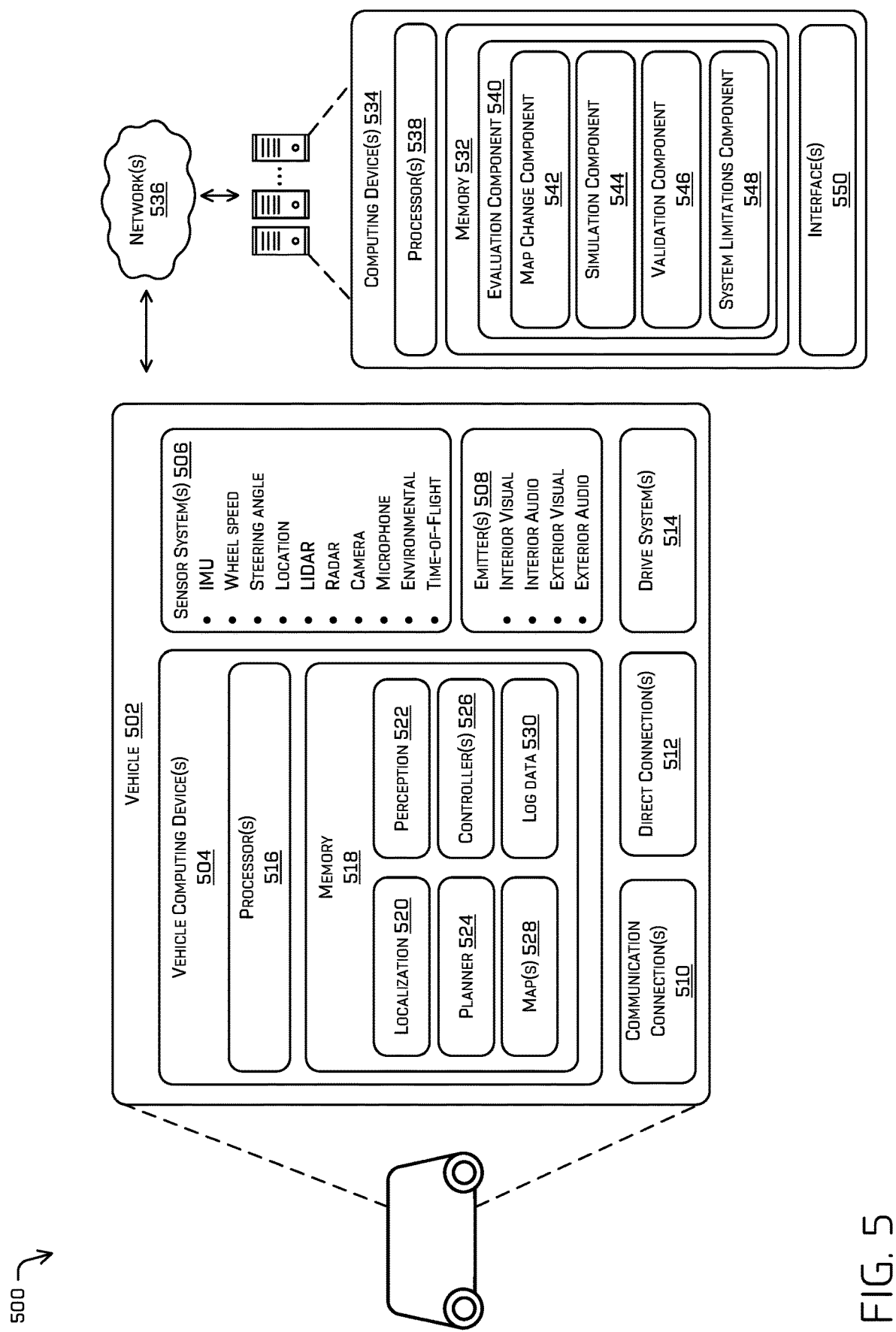
FIG. 5 is a block diagram of an example system for implementing the techniques described herein.

FIG. 5 is a block diagram of an example system 500 for implementing the techniques described herein. In at least one example, the system 500 may include a vehicle 502, such as vehicle 104.

The vehicle 502 may include a vehicle computing device 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device 504 stores a localization component 520, such as localization component 520, a perception component 522, a planner component 524, one or more system controllers 526, one or more maps 528, and log data 530. Though depicted in FIG. 5 as residing in the memory 518 for illustrative purposes, it is contemplated that the localization component 520, the perception component 522, the planner component 524, the system controller(s) 526, and the map(s) 528 may additionally, or alternatively, be accessible to the vehicle 502 (e.g., stored on, or otherwise accessible by, memory remote from the vehicle 502, such as, for example, on memory 532 of a computing device 534). As described herein, the localization component 520, the perception component 522, the planner component 524, the system controller(s) 526, may be collectively comprise a vehicle controller.

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for generating a path polygon associated with the vehicle path, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.).

In additional or alternative examples, the perception component 522 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planner component 524 may determine a path for the vehicle 502 to follow to traverse through an environment. For example, the planner component 524 may determine various routes and trajectories and various levels of detail. For example, the planner component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 524 may generate an instruction for guiding the vehicle 502 along at least a portion of the route from the first location to the second location. In at least one example, the planner component 524 may determine how to guide the vehicle 502 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planner component 524 may include a prediction component to generate predicted trajectories of objects in an environment. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device(s) 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the maps 528. That is, the maps 528 may be used in connection with the localization component 520, the perception component 522, and/or the planner component 524 to determine a location of the vehicle 502, detect objects in an environment, and/or generate routes and/or trajectories to navigate within an environment. Additionally, in some examples, the maps 528 may be used in connection with a tracker component to determine a position and/or orientation of the vehicle with respect to a planned trajectory, such as based on steering angles, velocities, accelerations, drive direction, drive gear, and/or gravity acceleration.

In some examples, the one or more maps 528 may be stored on a computing device(s) (such as the computing device(s) 534) accessible via network(s) 536. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the memory 518 may store log data 530. The log data 530 may represent data input and/or output by each of the localization component 520, the perception component 522, the planner component 524, the controller(s) 526, and/or outputs of various subcomponents thereof. In at least one example the log data 530 may include sensor data captured and provided to one or more of the components of the vehicle computing device(s) 504 by the sensor systems 506.

As can be understood, the components discussed herein (e.g., the localization component 520, the perception component 522, the planner component 524, the one or more system controllers 526, and the one or more maps 528 are described as divided for illustrative purposes. However, the operations performed by the various components may be combined or performed in any other component. For example, in the illustrative example, the functions of a tracker component as described above may be performed by the planner component 524. However, in other examples, the tracker component may include a separate component independent of the planner component 524.

In some instances, aspects of some or all of the components discussed herein may include any models, techniques, and/or machine learning techniques. For example, in some instances, the components in the memory 518 (and the memory 532, discussed below) may be implemented as a neural network.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device(s) 504. Additionally, or alternatively, the sensor system(s) 506 may send sensor data, via the one or more networks 536, to the one or more computing device(s) 534 at a particular frequency, after a lapse of a predetermined period of time, in near real-time, etc.

The vehicle 502 may also include one or more emitters 508 for emitting light and/or sound, as described above. The emitters 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connection(s) 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device(s) 534, other nearby vehicles, etc.) and/or one or more remote sensor system(s) for receiving sensor data.

The communications connection(s) 510 may include physical and/or logical interfaces for connecting the vehicle computing device 504 to another computing device or a network, such as network(s) 536. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration associated with the drive systems, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle 502. In some instances, the direct connection 512 may further releasably secure the drive system(s) 514 to the body of the vehicle 502.

In at least one example, the localization component 520, the perception component 522, the planner component 524, and/or the one or more system controllers 526, and/or various components thereof, may process sensor data, as described above, and may send their respective outputs as log data 530, over the one or more network(s) 536, to the computing device(s) 534. In at least one example, the vehicle computing device(s) 504 may send the log data 530 to the computing device(s) 534 at a particular frequency, after a lapse of a predetermined period of time, in near real-time, etc.

In some examples, the vehicle 502 may send sensor data to the computing device(s) 534 via the network(s) 536. In some examples, the vehicle 502 may receive sensor data from the computing device(s) 534 via the network(s) 536. The sensor data may include raw sensor data and/or processed sensor data and/or representations of sensor data. In some examples, the sensor data (raw or processed) may be sent and/or received as one or more log files.

The computing device(s) 534 may include processor(s) 538 and a memory 532 storing an evaluation component 540. The evaluation component 540 (e.g., evaluation computing system) of the computing device(s) 534 may be configured to evaluate the performance of a vehicle controller, as described above with regard to FIGS. 1-4.

In the illustrative example, the evaluation component 540 may include a map change component 542, a simulation component 544, a validation component 546, and/or a system limitations component. The map change component 542 may be configured to determine a portion of an environment to inject a simulated change into one or more maps 528 of a vehicle. The map change component 542 may determine a type of change (e.g., an addition, a deletion, a rotation, and/or a shift) and a value associated with the change. As discussed above, the value associated with the change may specify a rotation angle, a shift direction, a shift distance, or the like. The map change component 542 may determine a series of changes to inject based on previous log data indicating portions of an environment exhibiting high variance of detections of objects within the environment.

The simulation component 544 may be configured to generate a simulation for evaluating a component and/or subcomponent of the vehicle controller. The simulation may include a simulation of a particular component, such as the localization component and/or a vehicle simulation, such as a simulation associated with a planner component, a tracker component, one or more system controller(s) 526, and the like, representative of a vehicle action based on the simulated change. The simulation component 544 may analyze log data to determine a detection associated with a physical environment. The evaluation computing system may then map a position, corresponding to the detection associated with the physical environment, to the original map data. In some examples, the evaluation computing system may determine a semantic class associated with the detection based on the log data, and then may determine a distance threshold associated with the detection based on the semantic class. The distance threshold may define the portion of the physical environment where the simulated change may be implemented.

The validation component 546 may be configured to validate the component and/or subcomponent evaluated based on results of one or more simulations associated with respective simulated changes. In some examples, the validation component 546 may determine one or more positions of a simulated vehicle following a simulated trajectory during a simulation. The validation component 546 may compare one or more of the positions to respective positions of the vehicle in the log data at points in time that correspond. In some examples, the validation component 546 may be configured to determine a difference between a simulated position at a point in time and a position of the vehicle at a corresponding point in time. Additionally, the validation component may be configured to determine whether a vehicle controller is valid or invalid, based on comparing an observed difference between a simulated position of the simulated vehicle and a position of the vehicle traversing the environment satisfy a threshold difference.

The system limitations component 548 may be configured to determine a threshold difference between a simulated position at a point in time and a position of the vehicle at a corresponding point in time, as represented by the log data. In some examples, the systems limitations component 548 may determine the threshold difference based at least in part on the simulated change. In some examples the threshold difference may correspond to an estimated position along an estimated trajectory that deviates from an original trajectory by one of, the shift distance of the simulated change, the rotation angle of the simulated change, a landmark associated with the simulated change, and/or a combination of any number thereof.

In various examples, the computing device(s) 534 may include one or more input/output (I/O) devices, such as via one or more interfaces 550. The interface(s) 550 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In some examples, a user may view a user interface associated with the evaluation component 540, such as to input data and/or view results via one or more interface(s) 550. In such examples, the interface(s) 550 may include one or more displays. Depending on the type of computing device, such as a user computing device, server computing device, or the like, the display may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a graphical user interface presented on the display. Accordingly, examples herein are not limited to any particular display technology.

The processor(s) 516 of the vehicle 502 and the processor(s) 538 of the computing device(s) 534 may be any suitable processor capable of executing instructions to process data and perform operations as described herein. By way of example and not limitation, the processor(s) 516 and 538 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 518 and 532 are examples of non-transitory computer-readable media. The memory 518 and 532 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 518 and 532 can be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

EXAMPLE CLAUSES

A. A system comprising: one or more processors; and one or more non-transitory computer-readable media storing computer-executable instructions that, when executed, cause the system to perform operations comprising: receiving log data associated with an autonomous vehicle operating in a physical environment; receiving map data associated with the physical environment; modifying the map data to generate modified map data representative of a simulated change associated with a portion of the physical environment, wherein the simulated change affects a semantic based localization system associated with a simulated vehicle controller; generating, based at least in part on the log data and the modified map data, a simulated environment representing the physical environment, the simulated environment including the simulated change associated with the portion of the physical environment; determining a simulated trajectory for the simulated vehicle controller to traverse the simulated environment; evaluating, as a simulation, simulated motion of the simulated vehicle controller following the simulated trajectory in the simulated environment; determining, based on the simulation, a difference between a first position of the autonomous vehicle in the log data and a second position of a simulated vehicle associated with the simulated vehicle controller in the simulated environment; and validating the simulated vehicle controller based at least in part on the difference.

B. The system of paragraph A, the operations further comprising: determining, based at least in part on the log data, a detection associated with a position in the physical environment; determining, based at least in part on the log data, a semantic class associated with the detection; determining a distance threshold associated with the detection based at least in part on the semantic class; and determining the portion of the physical environment based at least in part on the distance threshold associated with the detection.

C. The system of paragraphs A or B, the operations further comprising: determining, based at least in part on the log data, a detection associated with the portion of the physical environment; determining a variance associated with the detection; determining that the variance associated with the detection satisfies a threshold variance; and wherein modifying the map data to generate the modified map data representative of the simulated change associated with the portion of the physical environment is based at least in part on determining that the variance associated with the detection associated with the portion of the physical environment satisfies the threshold variance.

D. The system of any one of paragraphs A-C, wherein the simulated change comprises rotating the portion of the physical environment in a first rotational direction by a first rotation angle.

E. The system of any one of paragraphs A-D, wherein the simulated change comprises shifting the portion of the physical environment a first distance in a first direction.

F. A method comprising: receiving log data associated with a vehicle operating in a physical environment, the log data associated with a trajectory the vehicle followed while operating in the physical environment; receiving map data associated with the physical environment; generating modified map data representative of a simulated change associated with a portion of the physical environment, wherein the simulated change affects a semantic based localization system associated with a simulated vehicle controller; generating, based at least in part on the modified map data, a simulated environment representing the physical environment; determining, based at least in part on the simulated vehicle controller, a simulated trajectory for a simulated vehicle to follow in the simulated environment; determining a difference between the trajectory and the simulated trajectory; and validating the simulated vehicle controller based at least in part on the difference.

G. The method of paragraph F, further comprising: determining, based at least in part on the log data, a detection associated with the physical environment; determining, based at least in part on the log data, a semantic class associated with the detection; determining a distance threshold associated with the detection based at least in part on the semantic class; and determining the portion of the physical environment based at least in part on the distance threshold associated with the detection.

H. The method of paragraphs F or G, further comprising: determining, based at least in part on the log data, a detection associated with the portion of the physical environment; determining a variance associated with the detection; determining that the variance associated with the detection satisfies a threshold variance; and wherein modifying the map data to generate the modified map data representative of the simulated change associated with the portion of the physical environment is based at least in part on determining that the variance associated with the detection associated with the portion of the physical environment satisfies the threshold variance.

I. The method of any one of paragraphs F-H, wherein the simulated vehicle controller further comprises a global solver that determines localization information based at least in part on lidar data and the semantic based localization system.

J. The method of any one of paragraphs F-I, wherein the map data includes at least one landmark, and the simulated change comprises changing one of a position, an orientation, or a semantic type of the at least one landmark in the modified map data.

K. The method of any one of paragraphs F-J, wherein the simulated change comprises rotating the portion of the physical environment in a first rotational direction by a first rotation angle.

L. The method of any one of paragraphs F-K, wherein the simulated change comprises shifting the portion of the physical environment a first distance in a first direction.

M. The method of any one of paragraphs F-L, wherein the vehicle is an autonomous vehicle, the method further comprising sending a command to the autonomous vehicle to enable the simulated vehicle controller to control the autonomous vehicle.

N. One or more non-transitory computer-readable media storing instructions executable by one or more processors, wherein the instructions, when executed, cause the one or more processors to perform operations comprising: receiving log data associated with a vehicle operating in a physical environment, the log data associated with a trajectory the vehicle followed while operating in the physical environment; receiving map data associated with the physical environment; generating modified map data representative of a simulated change associated with a portion of the physical environment, wherein the simulated change affects a semantic based localization system associated with a simulated vehicle controller; generating, based at least in part on the modified map data, a simulated environment representing the physical environment; determining based at least in part on the simulated vehicle controller, a simulated trajectory for a simulated vehicle to follow in the simulated environment; determining a difference between the trajectory and the simulated trajectory; and validating the simulated vehicle controller based at least in part on the difference.

O. The one or more non-transitory computer-readable media of paragraph N, the operations further comprising: identifying, based at least in part on the log data, a detection associated with the physical environment; determining, based at least in part on the log data, a semantic class associated with the detection; determining a distance threshold associated with the detection based at least in part on the semantic class; and determining the portion of the physical environment based at least in part on the distance threshold associated with the detection.

P. The one or more non-transitory computer-readable media of paragraphs N or O, wherein the simulated vehicle controller further comprises a global solver that determines localization information based at least in part on lidar data and the semantic based localization system.

Q. The one or more non-transitory computer-readable media of any one of paragraphs N-P, wherein the map data includes at least one landmark, and the simulated change comprises changing one of a position, an orientation, or a semantic type of one of the landmark in the modified map data.

R. The one or more non-transitory computer-readable media of any one of paragraphs N-Q, wherein the simulated change comprises rotating the portion of the physical environment in a first rotational direction by a first rotation angle.

S. The one or more non-transitory computer-readable media of any one of paragraphs N-R, wherein the simulated change comprises shifting the portion of the physical environment a first distance in a first direction.

T. The one or more non-transitory computer-readable media of any one of paragraphs N-S, the operations further comprising sending an instruction to the vehicle to cause the simulated vehicle controller to control the vehicle.

While the example clauses described above are described with respect to one particular implementation, it should be understood that, in the context of this document, the content of the example clauses may also be implemented via a method, device, system, computer-readable medium, and/or another implementation.

Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the system to perform operations comprising:
receiving log data associated with an autonomous vehicle operating in a physical environment;
receiving map data associated with the physical environment;
injecting, into the map data, a systematic fault, wherein the systematic fault comprises one or more of a simulated addition, a simulated deletion, a simulated rotation, or a simulated shift associated with a portion of the physical environment corresponding to a lane marking, and
further wherein, when instantiated in a simulated environment representing at least the portion of the physical environment corresponding to the lane marking, the systematic fault affects a first semantic class of a semantic-based localization system associated with a simulated vehicle controller and leaves unaffected a second semantic class of the semantic-based localization system associated with the simulated vehicle controller;
generating, based at least in part on the log data and the systematic fault, the simulated environment representing the at least the portion of the physical environment corresponding to the lane marking;
determining a simulated trajectory for the simulated vehicle controller to cause a simulated vehicle to traverse the simulated environment;
evaluating, as a simulation, simulated motion of the simulated vehicle following the simulated trajectory;
determining, based on the simulation and at a simulated time at which the simulated vehicle controller causes the simulated vehicle to traverse the systematic fault, a simulated position of the simulated vehicle in the simulated environment;
determining, based on the log data and at a time corresponding to the simulated time, a physical position of the autonomous vehicle in the physical environment;
determining a difference between the physical position of the autonomous vehicle in the physical environment and the simulated position of the simulated vehicle in the simulated environment; and
validating the simulated vehicle controller based at least in part on the difference.

2. The system of claim 1, the operations further comprising:
determining, based at least in part on the log data, a detection associated with a position in the physical environment;
determining, based at least in part on the log data, the first semantic class associated with the detection;
determining a distance threshold associated with the detection based at least in part on the first semantic class; and
determining the portion of the physical environment corresponding to the lane marking based at least in part on the distance threshold associated with the detection.

3. The system of claim 1, the operations further comprising:
determining, based at least in part on the log data, a detection associated with the portion of the physical environment corresponding to the lane marking;
determining a variance associated with the detection;
determining that the variance associated with the detection satisfies a threshold variance; and
wherein injecting the systematic fault is based at least in part on determining that the variance associated with the detection associated with the portion of the physical environment satisfies the threshold variance.

4. The system of claim 1, wherein the systematic fault comprises the simulated rotation of the portion of the physical environment corresponding to the lane marking in a first rotational direction by a first rotation angle.

5. The system of claim 1, wherein the systematic fault comprises the simulated shift of the portion of the physical environment corresponding to the lane marking by a first distance in a first direction.

6. A method comprising:
receiving log data associated with a vehicle operating in a physical environment, the log data associated with a trajectory the vehicle followed while operating in the physical environment;
receiving map data associated with the physical environment;
generating, based at least in part on the map data, a simulated environment representing the physical environment;
injecting, into the map data, a fault comprising a change to be instantiated in the simulated environment, wherein the change is associated with a portion of the physical environment corresponding to a lane marking and affects a semantic-based localization system associated with a simulated vehicle controller;
determining, based at least in part on the simulated vehicle controller, a simulated trajectory for a simulated vehicle to follow in the simulated environment;
determining, based on a simulation of the simulated vehicle in the simulated environment and at a simulated time at which the simulated vehicle encounters the change, a simulated position of the simulated vehicle associated with the simulated vehicle controller in the simulated environment;
determining a physical position of the vehicle in the log data at a time corresponding to the simulated time;
determining a difference between the physical position of the vehicle in the log data and the simulated position of the simulated vehicle associated with the simulated vehicle controller in the simulated environment; and
validating the simulated vehicle controller based at least in part on the difference.

7. The method of claim 6, further comprising:
determining, based at least in part on the log data, a detection associated with the physical environment;
determining, based at least in part on the log data, a semantic class associated with the detection;
determining a distance threshold associated with the detection based at least in part on the semantic class; and
determining the portion of the physical environment corresponding to the lane marking based at least in part on the distance threshold associated with the detection.

8. The method of claim 6, further comprising:
determining, based at least in part on the log data, a detection associated with the portion of the physical environment corresponding to the lane marking;
determining a variance associated with the detection;
determining that the variance associated with the detection satisfies a threshold variance; and
wherein injecting the fault is based at least in part on determining that the variance associated with the detection satisfies the threshold variance.

9. The method of claim 6, wherein the simulated vehicle controller further comprises a global solver that determines localization information based at least in part on lidar data and the semantic-based localization system.

10. The method of claim 6, wherein the map data includes at least one landmark, and the change to be instantiated in the simulated environment comprises changing one of a position, an orientation, or a semantic type of the at least one landmark in the map data.

11. The method of claim 6, wherein the change to be instantiated in the simulated environment comprises rotating the portion of the physical environment corresponding to the lane marking in a first rotational direction by a first rotation angle.

12. The method of claim 6, wherein the change to be instantiated in the simulated environment comprises shifting the portion of the physical environment corresponding to the lane marking a first distance in a first direction.

13. The method of claim 6, wherein the vehicle is an autonomous vehicle, the method further comprising sending a command to the autonomous vehicle to enable the simulated vehicle controller to control the autonomous vehicle.

14. One or more non-transitory computer-readable media storing instructions executable by one or more processors, wherein the instructions, when executed, cause the one or more processors to perform operations comprising:
receiving log data associated with a vehicle operating in a physical environment, the log data associated with a trajectory the vehicle followed while operating in the physical environment;
receiving map data associated with the physical environment;
generating, based at least in part on the map data, a simulated environment representing the physical environment;
injecting, into the map data, a fault comprising a change to be instantiated in the simulated environment, wherein the change is associated with a portion of the physical environment corresponding to a lane marking and affects a semantic-based localization system associated with a simulated vehicle controller;
determining, based at least in part on the simulated vehicle controller, a simulated trajectory for a simulated vehicle to follow in the simulated environment;
determining, based on a simulation of the simulated vehicle in the simulated environment and at a simulated time at which the simulated vehicle encounters the change, a simulated position of the simulated vehicle associated with the simulated vehicle controller in the simulated environment;
determining a physical position of the vehicle in the log data at a time corresponding to the simulated time;
determining a difference between the physical position of the vehicle in the log data and the simulated position of the simulated vehicle associated with the simulated vehicle controller in the simulated environment; and
validating the simulated vehicle controller based at least in part on the difference.

15. The one or more non-transitory computer-readable media of claim 14, the operations further comprising:
identifying, based at least in part on the log data, a detection associated with the physical environment corresponding to the lane marking;
determining, based at least in part on the log data, a semantic class associated with the detection;
determining a distance threshold associated with the detection based at least in part on the semantic class; and
determining the portion of the physical environment based at least in part on the distance threshold associated with the detection.

16. The one or more non-transitory computer-readable media of claim 14, wherein the simulated vehicle controller further comprises a global solver that determines localization information based at least in part on lidar data and the semantic-based localization system.

17. The one or more non-transitory computer-readable media of claim 14, wherein the map data includes at least one landmark, and the change to be instantiated in the simulated environment comprises changing one of a position, an orientation, or a semantic type of one of the at least one landmark in the modified map data.

18. The one or more non-transitory computer-readable media of claim 14, wherein the change to be instantiated in the simulated environment comprises rotating the portion of the physical environment corresponding to the lane marking in a first rotational direction by a first rotation angle.

19. The one or more non-transitory computer-readable media of claim 14, wherein the change to be instantiated in the simulated environment comprises shifting the portion of the physical environment corresponding to the lane marking a first distance in a first direction.

20. The one or more non-transitory computer-readable media of claim 14, the operations further comprising sending an instruction to the vehicle to cause the simulated vehicle controller to control the vehicle.

* * * * *